United States Patent [19]

Getz et al.

[11] Patent Number: 5,464,709
[45] Date of Patent: Nov. 7, 1995

[54] ALKALINE CELLS THAT ARE SUBSTANTIALLY FREE OF MERCURY

[75] Inventors: Dale R. Getz, North Ridgeville; John C. Nardi, Brunswick; Robert F. Scarr, Westlake, all of Ohio

[73] Assignee: Eveready Battery Company, Inc., St. Louis, Mo.

[21] Appl. No.: 349,164

[22] Filed: Dec. 2, 1994

Related U.S. Application Data

[63] Continuation of Ser. No. 255,158, Jun. 7, 1994, Pat. No. 5,395,714, which is a continuation of Ser. No. 82,147, Jun. 25, 1993, Pat. No. 5,364,715, which is a continuation of Ser. No. 566,925, Aug. 14, 1990, abandoned.

[51] Int. Cl.$^6$ ..................................................... G03C 3/00
[52] U.S. Cl. ........................ 429/229; 429/206; 429/224; 429/230
[58] Field of Search ................................... 429/206, 224, 429/229, 230

[56] References Cited

U.S. PATENT DOCUMENTS

| | | | |
|---|---|---|---|
| 3,847,669 | 11/1974 | Paterniti | 136/30 |
| 4,195,120 | 3/1980 | Rossler et al. | 429/50 |
| 4,432,937 | 2/1984 | Kuwayama et al. | 420/513 |
| 4,548,642 | 10/1985 | Glaeser | 75/0.5 |
| 4,606,984 | 8/1986 | Vignaud | 429/212 |
| 4,735,876 | 4/1988 | Miura et al. | 429/206 |
| 4,781,999 | 11/1988 | Vignaud | 429/214 |
| 4,840,644 | 6/1990 | Chalilpoyil et al. | 29/623.1 |
| 4,857,424 | 8/1989 | Larsen et al. | 429/206 |
| 4,939,048 | 7/1990 | Vignaud | 429/161 |
| 4,942,101 | 7/1990 | Audebert et al. | 429/165 |
| 4,992,343 | 2/1991 | Nardi | 429/57 |
| 5,112,705 | 5/1992 | Hunter et al. | 429/206 |
| 5,364,715 | 11/1994 | Getz et al. | 429/229 |
| 5,395,714 | 3/1995 | Scarr | 429/229 |

FOREIGN PATENT DOCUMENTS

| | | |
|---|---|---|
| 205783 | 6/1985 | European Pat. Off. . |
| 8810013 | 7/1988 | France . |
| 8810016 | 7/1988 | France . |
| 32768 | 12/1956 | Japan . |
| 51-32363 | 1/1972 | Japan . |
| 60-43634 | 3/1985 | Japan . |
| 60-244292 | 10/1985 | Japan . |
| 3-55024 | 8/1991 | Japan . |

*Primary Examiner*—Deborah Jones
*Attorney, Agent, or Firm*—Robert W. Welsh; Richard C. Cooper

[57] ABSTRACT

Alkaline cells are substantially free of mercury, and employ a zinc anode gel, which gel has a which expansion of less than 25% after being discharged for 161 minutes to 15% depth of discharge at 2.88A.

12 Claims, 2 Drawing Sheets

ALKALINE CELLS THAT ARE SUBSTANTIALLY FREE OF MERCURY

This is a continuation of application Se. No. 08/255,158, filed Jun. 7, 1994, now U.S. Pat. No. 5,395,714, which is a continuation of application Ser. No. 08/082,147, filed Jun. 25, 1993, now patented under U.S. Pat. No. 5,364,715, which is a continuation of abandoned application Ser. No. 07/566,925, filed Aug. 14, 1990.

FIELD OF THE INVENTION

This invention relates to alkaline electrochemical cells that are substantially free of mercury.

BACKGROUND OF THE INVENTION

Alkaline electrochemical cells typically contain an alkaline electrolyte, such as potassium hydroxide (KOH), a cathode comprised of a metal oxide such as manganese dioxide, ($MnO_2$), and a zinc anode. These cells provide excellent performance and are used throughout the world in many consumer applications.

A detrimental characteristic of these cells is the formation of hydrogen gas. This gas can be formed by undesirable corrosion of the zinc. As the quantity of gas increases, the internal pressure in the cell also increases. If this pressure increase is not relieved, the cells can eventually leak.

A widely used solution to the corrosion of the zinc is the addition of mercury to the anode as a corrosion inhibitor. Mercury effectively inhibits the corrosion of zinc and the formation of gas, and thus enhances the performance of the electrochemical cell. Unfortunately, as is well known, mercury may add to environmental pollution.

To address this environmental concern, the amount of mercury used in the cell has been lowered by adding zinc corrosion inhibitors to the cell. Examples of these inhibitors include lead, indium, cadmium, thallium, gold, silver, tin, gallium and compounds that incorporate these elements. These inhibitors have been alloyed with the zinc, deposited on the zinc, included in the electrolyte and deposited on the collector. Organic inhibitors, such as polyethylene glycol, have also been tried. These methods have led to the commercialization of low mercury content batteries, called "Ultra-low Mercury," that have about 250 parts of mercury per million parts based on total battery weight.

Unfortunately, the inhibitor methods employed to not reliably permit the total removal of mercury from the cell. For example, indium is an effective inhibitor at certain levels of mercury, but surprisingly, at lower levels of mercury, indium is not as effective. Also, indium does not function well as an inhibitor for undischarged cells. The organic inhibitors are effective for cells that are undischarged and stored, but they do not inhibit gassing for cells that are partially discharged and then stored.

In view of these disadvantages, an alkaline electrochemical cell that is substantially free of mercury has not been commercialized. Moreover, considering the environmental concerns, such a cell is still desired.

SUMMARY OF THE INVENTION

This invention is an electrochemical cell that is substantially free of mercury. The cell comprises an alkaline electrolyte, a cathode comprising a metal oxide as the active cathode component, and an anode comprised of zinc as the active anode component. The cell components are arranged in a sealed container in a manner effective to provide electrochemical energy. The cells do not exhibit leakage of the cell components after being partially discharged via an electrical resistor to about 1.2 volts, and then stored under storage conditions of 21° C. for ninety day.

In another aspect, this invention is an electrochemical cell that has less than two parts of mercury based on one million parts by weight of the cell. The cell is comprised of potassium hydroxide electrolyte solution; a cathode comprising electrolytic manganese dioxide and synthetic graphite; an anode gel comprising low expansion zinc, between about 0.01 mg to about 1 mg per gram of zinc of indium hydroxide, and between about 0.001 mg to about 0.1 mg per gram of zinc of methoxylated polyethylene oxide having an average molecular weight ranging from about 300 to about 700. The cell further employs a burnished brass anode current collector. The cell components are arranged in a sealed container in a manner effective to provide electrochemical energy, and such that the cell has a void volume of between about 6% and about 12% of the cell's internal volume.

In yet another aspect, this invention is an electrochemical cell that is substantially free of mercury. The cell comprises an alkaline electrolyte, a cathode and an anode arranged in a sealed container in a manner effective to provide electrochemical energy, wherein the anode is comprised of low expansion zinc as the active anode material.

In still yet another aspect, this invention is an electrochemical cell that is substantially free of mercury. The cell comprises an alkaline electrolyte, a cathode and an anode arranged in a sealed container in a manner effective to provide electrochemical energy, wherein the anode is a gel comprised of zinc as the active anode material, an indium-containing compound and an ethylene oxide polymer.

The alkaline electrochemical cells of this invention are substantially free of mercury. The cells do not leak under conditions of normal use and storage, and provide an effective amount of electrochemical energy to be useful as batteries.

DETAILED DESCRIPTION OF THIS INVENTION

Figure 1:
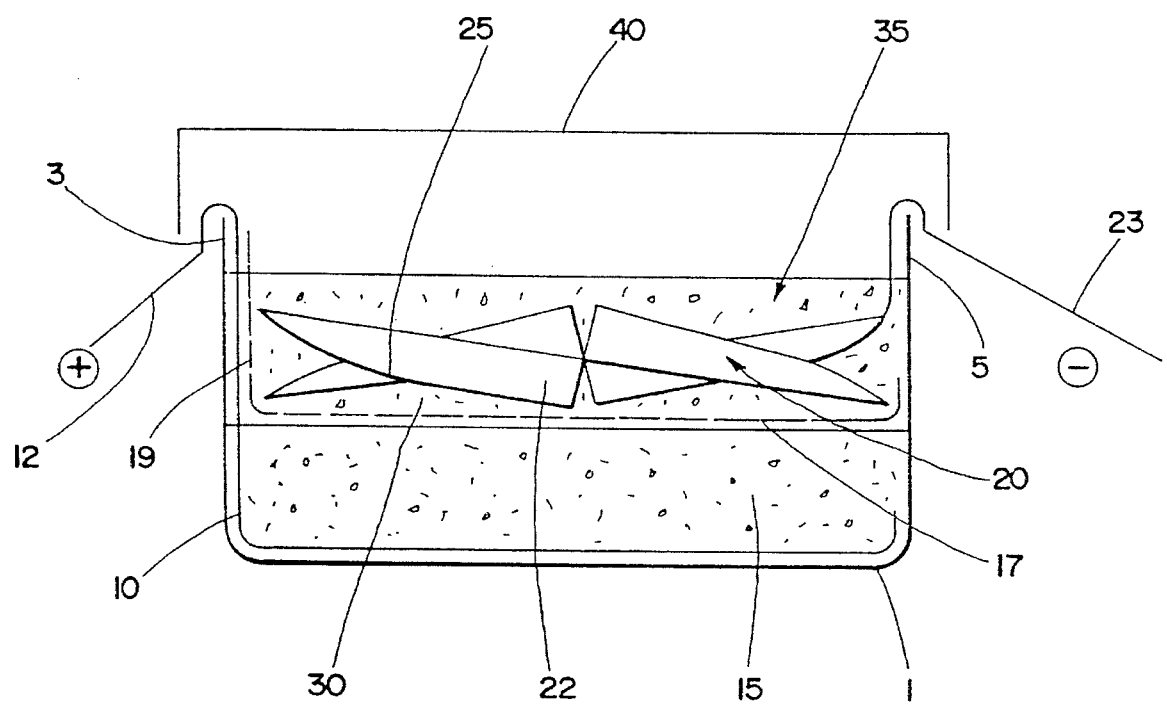
FIG. 1 shows a cell diagram used in measuring the expansion of a zinc anode gel mix.

The electrochemical cells of this invention are substantially free of mercury. By "substantially free of mercury" is meant that the total amount of mercury present in all the components of the cell in an amount which does not result in a harmful amount of environment pollution when it is disposed of. Typically, the cells of this invention have less than 50 parts of mercury per million parts by total weight of the cell. Preferably, the mercury is present at less than 25 parts per million. More preferably, there is zero-added mercury to the cell. By "zero-added" is meant that no mercury is added to any of the cell components. Typically, the residual amount of mercury can be present in many natural products. Thus, for the preferred zero-added mercury cells of this invention the only amount of mercury present in the cell is the residual amount that is naturally present in the cell components. Thus, when the cells are disposed of, no amount of mercury is added to the environment that is greater than the amount that was present before the cell was assembled. For example, commercially available "pure zinc" can contain about 20 parts of mercury per billion parts of weight of zinc, and often contains much less than 20 parts per billion. For the zero-added mercury cells of this invention, the amount of mercury present will preferably be less than the level that can be detected analytically. Typically, the amount is less than 10 parts per million by total weight of the cell, preferably less than 5 parts per million, more preferably less than 2 parts per million, and most preferably less than 1 part per million.

The electrochemical cells of this invention comprise an alkaline electrolyte, a cathode and an anode arranged in a sealed container in a manner effective to provide electrochemical energy, i.e. when the cell is placed in a circuit, electrochemical energy is provided to the circuit. The cells have terminals of opposite polarity. One terminal is in contact with the cathode and the other is in contact with the anode. The cell is sealed in a manner effective to contain the cell components in the container under conditions of transport and use. The cell construction can include a cupped metallic can, suitably constructed of steel, nickel or other metal and can be nickel plated in whole or in part. A tubular cathode containing the active cathode material and conductor can be lined on the inner surface of the can, and a separator suitably made of a non-woven cellulosic or polymer fiber can be lined on the inner surface of the tubular cathode. In this construction, the can is in contact with the cathode and thus is the cathode terminal.

An anode made of a mixture of active anode material, electrolyte, optionally an electrolyte-swellable binder such as a polyacrylic acid can be enclosed within the separator. An anode current collector, such as in the form of a pin, is inserted into the anode. The cell is closed with a cover and sealed. The cover is in contact with the anode current collector and is the anode terminal of the cell.

Any conventional seal can be employed. It is desired that the cell construction not have a venting means that would vent due to the normal pressure generated in the cell during a normal discharge.

The electrolyte used in this invention is an aqueous alkaline solution, such as potassium hydroxide or sodium hydroxide. The concentration of the solution is any concentration that provides for ionic conductivity. Typically, in the assembled cell the concentration preferably ranges from about 30% to about 40%.

The cathode used in this invention is comprised of a metal oxide as the active cathode component. Examples include manganese dioxide and silver oxide. Preferred is maganese dioxide, and more preferred is electrolytic manganese dioxide (EMD). EMD, a widely available commercial product, is prepared by plating manganese dioxide from a manganese sulphate plating solution onto an electrode. The deposited manganese dioxide is subsequently removed form the electrode and recovered. One source is the TOSOH Corporation a Japanese company.

In addition to the metal oxide, the cathode further comprises a compound that is ionically conductive. This compound is called a conductor. Of the many types of known conductors, synthetic graphite is preferably used in the cells of this invention. Synthetic graphite is readily commercially available. One source is Lonza LTD, a Swiss company.

The cathode can further comprise a binder. Examples of suitable binders include polytetrafluoroethylene and polyethylene.

The cathode comprise a major amount of the metal oxide, a conductive amount of the graphite and often an effective amount of binder. Typically, the metal oxide will comprise between about 80 to about 85 weight percent of the total cathode weight. When a binder is employed, the binder will comprise less than about 0.5% by weight. The remainder of the cathode will be electrolyte solution is sufficient to wet the dry components, and to provide a mixture that can be molded. The cathodes are prepared by mixing the components together and dispensing the mix into the container. The mix is then molded or compressed against the inside of the container.

Zinc is used as the active anode material in the cells of this invention. Preferably, the zinc is low expansion zinc, and is in powder form. The powdered zinc is combined with a binder, optional components, and an amount of the electrolyte solution to form a gel. Typically, the anode gel expands when it is discharged and then stored.

The expansion rate due to gassing of fresh or discharged mixes of gelled zinc powder can be measured by the change in volume of the mix after being stored at expansion conditions. These conditions are, for example, storing for 24 hours at 71° C. The expansion behavior of zinc is dependent on rate and current density. These conditions in turn depend on the amount of the anode mix and the dimensions and geometry of the cell. The term "low expansion" is a relative term, and is determined by comparing the amount of expansion of different types of zinc anode gel mixes. Generally, the zinc used to prepare the anode gel that expands the least will provide a lower gassing cell, and, thus, in this invention, "low expansion zinc" means zinc that expands to a lower degree relative to other zincs. The degree of expansion of zinc anode gels can be measured by preparing an anode gel, assembling a cell and discharging the cell. An amount of the gel is then removed from the cell, placed in a container and stored. After storing, the amount of expansion is measured and compared to the amount of expansion of undischarged gel that is stored under the same conditions.

For the cells of this invention, the expansion rate of the anode gel is measured according to the following procedure. An anode mix is made of 63 weight percent zinc powder, 0.5 weight percent binder (Carbopol™940 is a suitable example), and 36.5 weight percent of aqueous potassium hydroxide electrolyte (37% aqueous solution) that contains 42.5 gm of zinc oxide per liter. The zinc oxide acts as the cathode depolarizer in this measurement cell. Referring to FIG. 1, an anode collector 10 in the form of a disk with a tap 12 is made from 33 ga cartridge brass sheet placed inside a flat bottomed 500 ml polypropylene beaker that is cut off at about the 250 ml level, thus providing a cell cup 1. The current collector is clipped to a tab 3 on the cup. One hundred grams of the anode mix 15 is added into the cup 1 on top of the anode current collector 10. A disk of separator paper 17 having the same diameter as the cup 1 diameter is placed on top of the anode mix 15. A strip of separator paper 19 is placed on the wall of the cup 1 to shield the anode collector tab 12 from the cathode collector 20. The cathode collector 20 is a piece of 0.011 inch thick Type "K" zinc sheet, and is cut in a 3 inch disk 22 with a 0.5 inch by 1.5 inch tab 23. The disk 22 contains openings 25 that permit escape of hydrogen gas during discharge. This cathode collector 22 is clipped to a tab 5 on the rim of the cup opposite from the tab 3 holding the anode collector 12. Space 10 is left between the separator 17 and the cathode collector 22 to allow for zinc deposit buildup during discharge. Enough electrolyte 35 is added to the cup 1 to cover the cathode collector 22, and a piece of plastic film 40 such as SARAN™ wrap is placed loosely over the cell.

Figure 2:
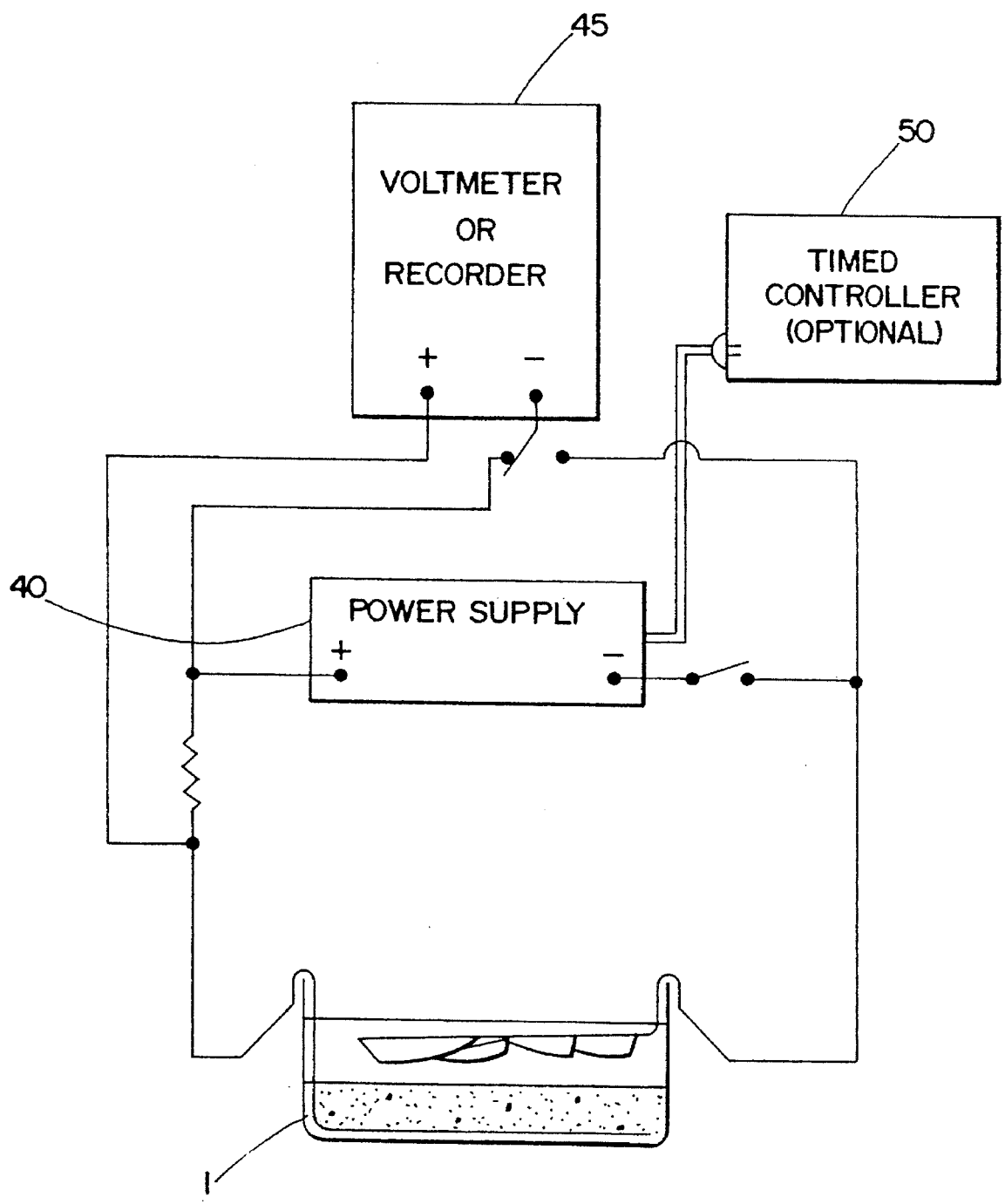
FIG. 2 shows a wiring diagram used in discharging a zinc anode gel mix.

Referring now to FIG. 2, the cell is connected to a 10 A, 20 V D.C. power supply 40. The cell is discharged to 15% depth of discharge at 2.88 A for 161 minutes as recorded by the timer 50. The voltage across a 1 ohm resistor is maintained at 2.88 V. The cell voltage is recorded by recorder 45 at the beginning and end of discharge. The cell voltage should be approximately 0.7 to 1.2 V. A low voltage can indicate a short in the cell. If a short develops, the cell should be disconnected, and any cathode deposits or dendrites should be removed. The cell can then be reconnected, and the test continued.

After the discharge is completed, a portion of the anode mix is measured to the six milliliter level into four polypropylene graduated cylinders that have a capacity of ten milliliters. The cylinders should contain about 17 grams of anode mix. The same amount of fresh undischarged anode mix should be measured into four other ten milliliter graduated cylinders. About 1 milliliter of low density, high vapor pressure oil, such as pump oil, that is insoluble in and inert to the electrolyte is added on top of the mix in each cylinder. The mix level and oil level is recorded, and the density of the mix can be calculated. It is approximately 2.7 ±0.15 g/cc.

The cylinders are placed in an oven preheated to 71° C., and are kept there at that temperature for twenty-four hours. The cylinders are then removed and cooled for about one half hour.

The mix and oil levels are then read. The specific expansion rate of the mix (SER) is calculated from the formula:

$$SER = \frac{\text{Volume of expansion of mix (ml)}}{\left(\begin{array}{c}\text{Weight of anode in mix}\\\text{in cylinder (g)}\end{array}\right) \times \left(\begin{array}{c}\text{Fraction of Zn}\\\text{in the mix}\end{array}\right)}$$

The relative volume expansion rate (SRVER) can also be measured and calculated from the formula:

$$SRVER = \frac{\text{Volume of expansion of mix (ml)}}{\text{Original Volume of mix (ml)}} \times 100$$

The low expansion zinc useful in the cells of this invention typically exhibit a SRVER of less than 40%, preferably less than 25%, more preferably less than 20%, and more preferably less than 15%.

Another parameter that has been found to be useful in identifying zinc for cells of this invention is the amount of iron in the zinc. Advantageously, the zinc has less than 10 parts of iron per million parts by weight of zinc. Preferably, the zinc contains less than 5 ppm of iron. More preferred is zinc that contains less than 3 ppm of iron.

The cells of this invention employ additives that inhibit the corrosion of zinc. One beneficial component to be added to the cell to inhibit the corrosion of zinc is an ethylene oxide polymer and derivatives thereof. The ethylene oxide polymers are comprised of ethylene oxide moieties and can be substituted with organic and inorganic moieties. Suitable polymers include phosphate esters of ethylene oxide polymers, such as those disclosed in U.S. Pat. No. 4,195,120; perfluorated organic compounds of the ethoxylated fluoroalchol type, such as those disclosed in U.S. Pat. No. 4,606,984; and alkyl and polyethoxylalcohol sulfides, such as those disclosed in U.S. Pat. No. 4,781,999, all herein incorporated by reference. Preferred polymers for use in this invention are di- and triethylene glycol, the polyethylene glycols having an average molecular weight range of about 190 to about 7000, and their mono- and diethers and esters.

Suitable ethers and esters of polyethylene glycols are the $C_4$ and lower alkyl ethers and $C_4$ and lower alkanoate esters. Examples of ether derivatives include methoxy diethylene glycol and the methoxy and ethoxy polyethylene glycols. Examples of ester derivatives include polyethylene glycol acetate.

The preferred ethylene oxide polymers are the polyethylene glycols and methoxy polyethylene glycols having molecular weights averaging from about 300 to 700.

The ethylene oxide polymers can be used singly or in combination. They are generally soluble in water, and can be added as a water solution to the cell. The ethylene oxide polymer can be added directly to the zinc during the production of the anode gel. Alternatively and additionally, the polymer additive can be included in water that is employed to pre-wet the separator in order to facilitate the wetting of the separator by the electrolyte. The polymer can then migrate to the zinc surface as the cell comes to equilibrium.

The ethylene oxide polymer is employed in the cell in an amount sufficient to inhibit the corrosion reaction between the zinc and the alkaline electrolyte. In general, beneficial effects are obtained with proportions of ethylene oxide polymer in excess of about 0.001 mg per gram of zinc, and preferably of about 0.01 mg per gram of zinc. Much larger proportions than these can be employed. For instance, amounts as large as 0.1 mg per gram of zinc have been employed and the beneficial effects obtained. However, amounts of the ethylene oxide polymer greater than about 0.1 mg per gram of zinc are generally considered to be in excess.

Another component useful to inhibit zinc corrosion is an indium-containing compound. Suitable compounds include indium hydroxide, indium oxide, indium metal and the like. Preferably, the compounds are soluble in the electrolyte solution, and, thus, indium hydroxide is preferred. The amount of indium employed is an amount sufficient to inhibit the corrosion reaction between the zinc and alkaline electrolyte. This amount is preferably between about 0.001 and about 1 mg per gram of zinc and more preferably, between about 0.05 and about 0.2 mg per gram of zinc.

The indium-containing compound is added in any manner that will enable it to become associated with the zinc. Preferably it is added directly into the anode mix. Additionally, the indium-containing compound can be added to the electrolyte solution.

The anode is prepared by mixing the zinc powder, ethylene oxide polymer, optional binder and an amount of electrolyte effective to form a paste or gel. Advantageously, the indium-containing compound is also added. This paste or gel can then be injected into the container.

A burnished brass anode current collector is preferably employed in the cells of this invention. This is inserted into the anode mix and is in contact with a terminal of the cell. By "burnishing" is meant that the surface of the collector is cleaned of surface oxides and residual contaminants. A clean shiny surface results. This can be accomplished by many means, for example, tumbling with ceramic balls. A preferred method is tumbling in the presence of a coating material that prevents oxidation of the burnished surface. Preferred coating materials are organic surfactants. A highly preferred example is polypropylene glycol.

The typical brass anode current collector has a composition of about 65% to 70% copper and about 30% to 35% zinc. The preferred anode current collectors is made of a conductive alloy containing a discontinuous dispersion of a minor amount of lead. An example of such an alloy is a copper-zinc-lead alloy. The amount of lead dispersed in the anode current collector made of a copper-zinc-lead alloy should be preferably at least 200 parts per million based on the weight of the alloy of the current collector.

In a copper-zinc-lead alloy current collector, the copper is required to provide adequate conductivity for the current collector while the zinc will be compatible with the zinc anode. Preferably, the copper should comprise at least 50 weight percent of the copper-zinc-lead alloy with the remainder substantially zinc and a minor amount of lead. A suitable copper-zinc-lead alloy for use as the anode current collector would be copper alloy C3300 containing from 65 to 68 weight percent copper, 0.25 to 0.7 weight percent lead, and the remainder zinc. It is advantageous that the brass current collector be free of iron and nickel. Other suitable brass alloys used as current collectors are known as C26000 and C27000.

In addition to a copper-zinc-lead alloy, any conductive material compatible with the electrochemical system of the cell could be used as the alloy material of the anode current collector. Thus, the anode current collector could be a conductive alloy composed of copper, zinc or brass containing a dispersion of lead throughout the alloy. A minor amount of cadmium in the anode current collector can also contribute to reducing gassing. The cadmium can be dispersed along with the lead throughout the anode current collector. The cadmium could be added in amount of at least 1000 parts per million based on the weight of the anode current collector. Preferably, the dispersed cadmium should be from 1500 parts per million to 2000 parts per million.

It is advantageous that space be left in the cell to accommodate any gas that is formed. This space, or void volume, will vary according to the cell size and amount of zinc employed. The larger the cell, generally, the larger the void volume. Typically, the cells of this invention have a void volume of 6% to 12% of the cell's internal volume.

The substantially mercury-free, non-leaking cells of this invention can be obtained in different ways with different combinations of the components. A preferred combination is the use of the electrolytic manganese dioxide, synthetic graphite, low-iron or low expansion zinc, ethylene oxide polymer, indium-containing compound and burnished brass current collector. A slightly less preferred combination includes the same components except for the indium-containing compound. Consistently good results are obtained with different variations in type of zinc, anode collector, etc. when used in combination with both the ethylene oxide polymer and indium-containing compound.

The electrochemical cells of this invention will typically have an initial voltage of about 1.58 as determined by the difference in potential between the zinc and the cathode. The cells exhibit no leakage of the cell components after discharging the cells through an electrical resistor to 1.2 volts, and after being stored at 21° C. for ninety days. Preferably, the cells of this invention exhibit no leakage after being discharged to 0.8 volts and then stored for the stated period. The cells can also exhibit no leakage after being discharged through an electrical resistor to 1.2 volts and then stored at 45° C. for thirty days, and preferably, after being discharged to 0.8 volts and so stored. More preferably, the cells exhibit no leakage when discharged through an electrical resistor to 1.2 volts, and then stored at 71° C. for three days, and most preferably, after being discharged to 0.8 volts and so stored. Most preferably, the cells exhibit no leakage when discharged through an electrical resistor to 1.2 volts, and then stored at 71° C. for seven days and preferably, after being discharged to 0.8 volts and so stored.

These discharge and storage conditions are representative of the actual use made of the cells or batteries. For example, the batteries can be used in a device, such as a radio. However, the battery is typically not fully discharged. The device and battery may then be put aside for a period before they are used again. The cells of this invention exhibit no leakage when conventionally used and so stored.

The value of the electrical resistance can vary according to cell size. Typically, the cells of this invention will exhibit no leakage when discharged through an electrical circuit that has an electrical resistance value of 20 ohms or less depending on cell size. For example, a conventional D-size cell or battery (2.406 inches high by 1.344 inches diameter) can be discharged to 1.2 volts though a 2.2 ohm resistor and stored without showing leakage. A C-size (1.969 inches high by 1.031 inches diameter) or AA-size (1.988 inches high by 0.563 inch diameter) cell or battery can be discharged through a 3.9 ohm resistor to 1.2 volts and stored without showing leakage. A AAA-size cell or battery (1.745 inches high by 0.41 inch diameter) can be discharged through a 5 ohm resistor to 1.2 volts and then stored without showing leakage. A AAAA-size cell or battery (1.648 inches high by 0.310 inch diameter) can be discharge through a 20 ohm resistor to 1.2 volts and then stored without showing leakage.

Under normal discharge conditions, hydrogen gas is formed and will cause the cells to bulge. If the cells bulge too much, they will leak. The actual amount of bulge that causes leakage will vary according to cell size. For C-size cells, a bulge of greater than 40 mils will often cause leakage. The cells of this invention, regardless of size, exhibit a degree of bulge less than the amount that will typically cause leakage of the cell components.

By "leakage" of the cell components is meant that there is no leakage of the components attributable to undesirable gas formation. It is always possible to have leakage due to poor cell construction such as improper sealing of the cell. This improper and poor performing construction conditions are known. Also, "leakage" as used in this specification is different from creepage of the electrolyte. By nature, aqueous alkaline electrolyte solutions creep along the surface of metals. The amount of creepage in a normally constructed cell is small, and is not equivalent to the type of leakage of the components that occurs when an undesirable amount of gas is formed.

The cells of this invention also exhibit an effective amount of performance. For example, C-size cells made according to the claimed invention and which contains 23.4 g of $MnO_2$ and 9.1 g of Zn provided 45 to 50 hours of usable service when discharged through a 10 ohm resistor for four hours per day.

The following example is provided to illustrate the concept of the invention. The example does not limit the scope of the invention.

EXAMPLES

Example 1

Several C-size cells are constructed, discharged and stored at different temperatures for different periods. The cells have no mercury added to them, and use pure zinc as the active anode material, electrolytic manganese dioxide as the active cathode material and potassium hydroxide as the electrolyte. The anode contains 0.01 mg methoxylated polyethylene oxide known as Carbowax™ 550 per gram of zinc and 0.02 mg of indium hydroxide per gram of zinc. The zinc is 6.2% SRVER expansion zinc, and contains 5.1 ppm of iron. The anode formulation is:

| Component | Weight % |
| --- | --- |
| Zinc | 63% |
| KOH | 36% |
| Carbopol™ C940 (Binder) | 0.6% |
| Carbowax™ 550 | 0.01 mg per gm of zinc |
| Indium Hydroxide | 0.02 mg per gm of zinc |

Trace amounts of zinc oxide and sodium silicate are added to yield 100 weight percent. These are used for their conventional purposes. The total anode weight is 14.43 grams and the amount of zinc in the anode is 9.1 grams.

| Component | Weight Percent |
| --- | --- |
| $MnO_2$ (electrolytic) | 80% |
| Synthetic Graphite | 10.5% |
| Polytetrafluoroethylene (Binder) | 0.3% |
| KOH | 9.2% |
| | 100.0% |

The total cathode weight is 29.2 grams and the amount of manganese dioxide is 23.4 grams.

Additional potassium hydroxide in the form of a 45% solution in water is added to the cell to provide a total electrolyte weight of 11.53 grams, of which 4.2 grams is potassium hydroxide. The total volume of the anode, cathode and electrolyte is 16.6 cc's, and the void volume is between about 10% to 12% of the cell's internal volume. The components are placed in a nickel-plated steel container, a burnished brass anode current collector is used, and the cell is sealed.

Ten cells are discharged through a 3.9 ohm resistor for about four hours to approximately 1.2 volts. The cells are then stored at 21° C. for ninety days. None of the cells exhibit leakage of the components. The average bulge is 8 mils, the maximum is 24 mils, the minimum is 0 and the standard deviation of the sample is 6.4 mils.

An additional four cells are discharged and stored under the same conditions. None of the cells exhibit leakage of the cell components. The average bulge is 8 mils, the maximum is 14 mils, the minimum is 5 mils, and the standard deviation is 3.9 mils.

An additional ten cells are then discharged under the same conditions, but they are stored at 45° C. for ninety days. None of the cells leak the cell components. The average bulge is 14 mils, the maximum is 18 mils, the minimum is 9 mils and the standard deviation is 2.6 mils.

Four other cells are discharged and stored at 45° C. for ninety days. None of the cells leak. The average bulge is 14 mils, the maximum is 16 mils, the minimum is 12 mils and the standard deviation is 1.9 mils.

An additional ten cells are discharged under the same conditions, but are stored at 71° C. for 28 days. None of the cells leak. The average bulge is 12 mils, the maximum is 21 mils, the minimum is 8 mils and the standard deviation is 4.9 mils.

Four more cells are discharged and stored at 71° C. for 28 days. None of the cells leak. The average bulge is 14 mils, the maximum is 23 mils, the minimum is 10 and the standard deviation is 6.4 mils.

This example shows the benefit of using low expansion zinc, the burnished brass current collector and the addition of both an ethylene oxide polymer and indium-containing compound in mercury-free cells. The cells can be partially discharged and stored under harsh conditions without leaking. The degree of bulging is very low. The cells of this Example exhibit bulging well below the 40 mil amount which often results in leakage.

Example 2

Cells are prepared in the same manner with the same components as in Example 1, except that no indium hydroxide is added.

Ten of these cells are discharged through a 3.9 ohm resistor for about four hours to approximately 1.2 volts. These are then stored at 21° C. for ninety days. None of the cells leak. The average bulge is 11 mils, the maximum is 17 mils, the minimum is 8 mils and the standard deviation is 3.1 mils.

Four more cells are discharged and stored under the same conditions. None of the cells leak. The average bulge is 13 mils, the maximum bulge is 24 mils, the minimum is 8 mils and the standard deviation is 7.5 mils.

Ten other cells are discharged under the same conditions but are stored at 45° C. for ninety days. None of the cells leak. The average bulge is 22 mils, the maximum is 35 mils, the minimum is 13 mils and the standard deviation is 8.8 mils.

Four other cells are discharged and stored at 45° C. for ninety days. None of the cells leak. The average bulge of the cells is 20 mils, the maximum is 21 mils, the minimum is 19 mils and the standard deviation is 1 mil.

An additional ten cells are discharged under the same conditions but are stored at 71° C. for 28 days. None of the cells leak. The average bulge of the cells is 18 mils, the maximum is 29 mils, the minimum is 7 mils and the standard deviation is 7.9 mils.

Another four cells are discharged and stored at 71° C. for 28 days. None of the cells leaked. The average bulge is 13 mils, the maximum is 15 mils, the minimum is 12 mils and the standard deviation is 1.5 mils.

This example shows the benefits of using the low expansion zinc, burnished brass current collector and ethylene oxide polymer in mercury-free cells. By comparing the bulge data of this example with the bulge data of Example 1, the additional benefit of the presence of indium hydroxide is illustrated. The cells with both indium hydroxide and ethylene oxide polymer generally show a lower average bulge.

What is claimed is:

1. An electrochemical cell comprising an alkaline electrolyte, a cathode comprising manganese dioxide as an active cathode component, and an anode gel comprised of zinc as the active anode component, wherein the cell contains less than 50 parts of mercury per million parts by weight of the cell and said zinc anode has a gel expansion of less than 25% after being discharged for 161 minutes to 15% depth of discharge at 2.88A.

2. The electrochemical cell of claim 1, wherein the cell contains less than 2 parts of mercury per million parts by weight of the cell.

3. The electrochemical cell of claim 2, wherein the cell contains less than 1 part of mercury per million parts by weight of the cell.

4. The electrochemical cell of claim 2, wherein the zinc anode has a gel expansion of less than 20%.

5. The electrochemical cell of claim 4, wherein the zinc anode has a gel expansion of less than 15%.

6. The electrochemical cell of claim 1 wherein the cell contains less than 25 parts of mercury per million parts by weight of the cell.

7. The electrochemical cell of claim 1 wherein the cell contains less than 20 parts of mercury per million parts by weight of the cell.

8. The electrochemical cell of claim 1 wherein said anode component further comprises at least one corrosion inhibitor of the group consisting of organic and inorganic additives.

9. The electrochemical cell of claim 8 wherein said corrosion inhibitor is an ethylene oxide polymer.

10. The electrochemical cell of claim 9 wherein said ethylene oxide polymer is a polyethylene glycol.

11. The electrochemical cell of claim 8 wherein said corrosion inhibitor comprises an indium-containing compound.

12. The electrochemical cell of claim 8 wherein said corrosion inhibitor comprises both organic and inorganic additives.

* * * * *

UNITED STATES PATENT AND TRADEMARK OFFICE
CERTIFICATE OF CORRECTION

PATENT NO.   : 5,464,709
DATED        : November 7, 1995
INVENTOR(S)  : Dale R. Getz et al.

It is certified that error appears in the above-identified patent and that said Letters Patent is hereby corrected as shown below:

Cover page, column 1, under "Related U.S. Application Data," "Jun. 25, 1993," should be --Jun. 24, 1993,--.

Signed and Sealed this

Seventeenth Day of November, 1998

*Attest:*

BRUCE LEHMAN

*Attesting Officer*   Commissioner of Patents and Trademarks